United States Patent [19]

Maeda et al.

[11] 4,299,944
[45] Nov. 10, 1981

[54] PROCESS FOR PRODUCING EPIHALOHYDRIN COPOLYMER RUBBER

[75] Inventors: Akio Maeda; Tatuo Usui; Atsushi Yasuda, all of Yokohama, Japan

[73] Assignee: Nippon Zeon Co. Ltd., Tokyo, Japan

[21] Appl. No.: 162,891

[22] Filed: Jun. 25, 1980

[30] Foreign Application Priority Data

Jun. 26, 1979 [JP] Japan .................................. 54-80556

[51] Int. Cl.³ ...................... C08G 65/12; C08G 65/14; C08G 65/24
[52] U.S. Cl. ........................................ 528/89; 528/94; 528/361; 528/416
[58] Field of Search ................... 528/361, 416, 89, 94

[56] References Cited

U.S. PATENT DOCUMENTS

| | | | |
|---|---|---|---|
| 3,697,496 | 10/1972 | Ueno et al. | 528/416 X |
| 3,700,608 | 10/1972 | Ueno et al. | 528/416 X |
| 3,880,779 | 4/1975 | Unoura et al. | 528/89 X |
| 4,024,109 | 5/1977 | Cherubim | 528/408 X |

FOREIGN PATENT DOCUMENTS 38-380544 5/1963 Japan .
46-27534 8/1971 Japan .

*Primary Examiner*—Earl A. Nielsen
*Attorney, Agent, or Firm*—Sherman & Shalloway

[57] ABSTRACT

A process for producing an epihalohydrin copolymer rubber, which comprises copolymerizing an epihalohydrin with another epoxy compound using as a catalyst the reaction product of an organoaluminum compound, a phosphoric acid compound and 1,8-diaza-bicyclo(5,4,-0)undecene-7 or its salt.

9 Claims, No Drawings

PROCESS FOR PRODUCING EPIHALOHYDRIN COPOLYMER RUBBER

This invention relates to a process for producing a high-molecular weight epihalohydrin copolymer rubber in a high yield by copolymerizing an epihalohydrin and another epoxy compound using as a catalyst the reaction product of an organoaluminum compound, a phosphoric acid compound, and 1,8-diaza-bicyclo(5,4,-0)undecene-7 or its salt.

There have heretofore been proposed various types of catalysts including those composed mainly of the organoaluminum compounds for use in the polymerization of epihalohydrin. For example, Japanese Patent Publication No. 5444/1963 proposed a catalyst composed of an organoaluminum compound having at least one Al-C bond in the molecule and a compound having at least one M-OH bond (wherein M represents an element of Groups II, III-B, IV-B or V-B of the periodic table) in the molecule. This catalyst, however, fails to give a high rate of polymerization in the polymerization of epihalohydrins, and is unsuitable for practical industrial application. Moreover, the resulting polymer has high crystallinity and, consequently, is not usable as rubber.

There have also been developed a number of catalysts in which a third component is added to the above catalyst system. Japanese Patent Publication No. 27534/71, for example, suggested a catalyst comprising three components of an organoaluminum compound, a phosphoric acid or more than 72.4% by weight of $P_2O_5$ content, and at least one compound selected from the group consisting of compounds represented by the formula $PR'_2PR''$, compounds represented by the formula $AsR'_2R''$ (in these formulae, R' is a hydrocarbon residue, and R'' is hydrogen or a hydrocarbon residue) and amines. Polymerization of epihalohydrins can be well performed by using this catalyst. But when used for the copolymerization of an epihalohydrin and another epoxy compound, this catalyst is not satisfactory in that a considerable amount of the catalyst is required depending on the kind of the third component, and the resulting copolymer has a low Mooney viscosity. It has therefore been desired to find a catalyst having high activity which can afford a high-molecular-weight copolymer rubber of epihalohydrin and other epoxy compounds in high yields.

Accordingly, the object of this invention is to provide a process for producing an epihalohydrin copolymer rubber, which meets the above needs.

In accordance with the present invention, there is provided a process for producing a high-molecular-weight epihalohydrin copolymer rubber, which is characterized by copolymerizing an epihalohydrin and other epoxy compounds using as a catalyst the reaction product of an organoaluminum compound, a phosphoric acid compound, and 1,8-diaza-bicyclo(5,4,0)undecene-7 or its salt.

The organoaluminum compound used in the process of this invention is a compound of the general formula $$AlR_nX_{3-n}$$

wherein R is a hydrocarbon radical, X is hydrogen, fluorine, chlorine, bromine, or iodine, and n is an integer of 1. to 3.

Typical examples of the organoaluminum compounds include triethylaluminum, triisobutylaluminum, tri-n-hexyaluminum, dimethylaluminum bromide, diethylaluminum chloride, ethylaluminum dichloride, diphenylaluminum chloride, and ethylaluminum sesquichloride. Mixtures of these organoaluminum compounds and aluminum halides can also be used.

The phosphoric acid compound used in the present invention is, for example, orthophosphoric acid, condensed phosphoric acid, and phosphorous acid. The condensed phosphoric acids include polyphosphoric acid, and metaphosphoric acid. An aqueous solution of phosphoric acid may be used, but since use of the aqueous solution with a high content of water tends to lower the catalyst activity, it is preferred to use an aqueous solution of phosphoric acid containing more than 65% by weight of phosphoric acid, calculated as $P_2O_5$.

The 1,8-diaza-bicyclo(5,4,0)undecene-7 (hereinafter abbreviated to DBU) is a compound represented by the following formula

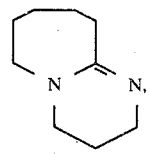

and its salts are represented by the following formula

wherein A is an inorganic acid, organic acid or phenol residue. Examples of the DBU salts are carbonates, 2-ethyl hexanoates, oleates, p-toluenesulfonates, formates, and phenolates. These DBU salts can be easily prepared by reacting DBU with acids or phenol compounds.

In preparing the catalyst, 0.01–10 mols, preferably 0.05–5 mols, of the phosphoric acid, and 0.001–10 mols, preferably 0.01–5 mols, of DBU or its salt are used per mol of the organoaluminum compound.

The order of reaction of the three components is not specifically limited. The organoaluminum compound is reacted either first with the phosphoric acid, and then with DBU or its salt, or is reacted first with DBU or its salt, then with the phosphoric acid. It is possible to add an epoxy compound to the three components. This occasionally results in a catalyst which provides improved rates of polymerization.

Preparation of the catalyst can be performed in an inert gas such as a nitrogen gas in the absence of a solvent or in the presence of an inert solvent. Examples of the inert solvents include hydrocarbons such as hexane, heptane, benzene, toluene, dimethyl ether, and tetrahydrofuran, and mixtures of at least two of them. The reaction temperature in the preparation of the catalyst is in the range of −50° to 150° C., preferably −20° to 100° C. The catalyst thus prepared can be used without further treatment as a highly active catalyst for copolymerization of epihalohydrins and other epoxy compounds. But if desired, it may be subjected to an aging treatment at room temperature to 200° C. for 10 minutes to two days, preferably 30° to 100° C. for 10 minutes to 3 hours to improve its catalyst activity.

The amount of the catalyst used in the polymerization of the invention is not specifically limited, and is generally 0.01–10 parts by weight per 100 parts by weight of the total amount of the epihalohydrin and other epoxy compound.

A catalyst prepared without using the organoaluminum compound or the phosphoric acid has lower activity than a catalyst prepared without DBU or its salt, and copolymerization of epihalohydrins and other epoxy compounds using such catalyst does not take place at all or takes place only to a slight extent. It is necessary therefore to use the reaction product of these three components as a catalyst in order to produce an industrially useful high-molecular-weight copolymer rubber in high yields.

The epihalohydrins to be copolymerized in the invention are, for example, epichlorohydrin, methylepichlorohydrin, epibromohydrin, and epiiodohydrin.

The other epoxy compounds polymerizable with the epihalohydrin include alkylene oxides such as ethylene oxide, propylene oxide, butylene oxide, isobutylene oxide, and butadiene monooxide; alicyclic epoxides such as cyclohexene oxide, and vinylcyclohexene oxide; alkyl or aryl glycidyl ethers such as allyl glycidyl ether, phenyl glycidyl ether, and chloroethyl glycidyl ether; and other epoxies such as glycidyl acrylate, glycidyl methacrylate, styrene oxide, and epoxystearate.

Generally, 20 to 98 mol % of the epihalohydrin and 80 to 2 mol % of the other epoxy compound are used as starting monomers.

The copolymerization in accordance with the present invention can be performed in a wide range of reaction temperature, i.e. −20° to 200° C., usually in a range of 0° to 100° C., preferably 30° to 80° C., in the presence or absence of the solvent. Examples of the solvent used in this invention are ethers such as diethyl ether, dipropyl ether, and diisopropyl ether; aromatic hydrocarbons such as benzene, toluene, and xylene; aliphatic or alicyclic hydrocarbons such as n-heptane, n-hexane, and cyclohexane; and halogenated hydrocarbons such as chlorobenzene, methyl chloride, methylene chloride, chlorform, carbon tetrachloride and ethylene dichloride.

Thus, in accordance with the process of this invention, a high-molecular-weight copolymer rubber can be prepared from an epihalohydrin and another epoxy compound in a high yield.

Homopolymerization of an epihalohydrin using the catalyst of the invention only provides a highly crystalline resinous polymer which is not industrially feasible as rubber.

The present invention is illustrated by the following Examples.

In the Examples, the reduced specific viscosity is $\eta$ SP/C determined for a solution of a polymer or copolymer in a diluent as follows: The polymer is dissolved in cyclohexanone containing 0.5% of 2,2'-methylenebis(4-methyl-6-tertiary butylphenol) as anti-oxidant to form a 0.1% polymer solution, and then the solution is heated at 100° C. to prepare a complete solution. The complete solution is cooled to 50° C., and the viscosity of the solution is measured at this temperature.

Comparison Example 1

In a 500 glass vessel purged with nitrogen, 1.5 g of orthophosphoric acid was dispersed in 100 ml of ethyl ether, and the dispersion was reacted with 50 ml of a solution of triisobutylaluminum in benzene taken from a 1-liter solution prepared by dissolving 200 g of triisobutylaluminum in benzene. The reaction temperature was maintained at 10° C. Then, the third component of the catalyst shown in Table 1 was added in an amount corresponding to 0.3 mol per mol of triisobutylaluminum to the above reaction product, and the mixture was further reacted at 60° C. for one hour to prepare a catalyst.

Then, a 100 ml glass ampoule purged with nitrogen was charged with 14.2 g of epichlorohydrin, 33.4 g of benzene, and the catalyst above prepared in an amount of 0.04 g as triisobutylaluminum, and the epichlorohydrin was polymerized at 60° C. for 2 hours. The reaction product was poured in hexane to generate the solvent and the unreacted monomer, and the resulting polymer was dried at 50° C. under reduced pressure for 24 hours. The yield of the polymer obtained is shown in Table 1. The results obtained in the absence of DBU are also shown in Table 1.

In any of these cases, epichlorohydrin polymer could be obtained, but the polymer was highly crystalline and resinous and was difficult to use as rubber.

TABLE 1

| Run No. | Third component of catalyst | Yield of polymer (%) |
|---|---|---|
| 1. | — | 10.0 |
| 2. | Pyridine | 32.1 |
| 3. | DBU | 61.2 |
| 4. | Phenolate of DBU | 49.2 |
| 5. | 2-ethylhexanoate of DBU | 66.7 |

Example 1 and Comparison Example 2

The catalysts were prepared in the same way as in Comparison Example 1 except that the third components of the catalyst shown in Table 2 were added in amounts corresponding to 0.1 mol per mol of triisobutylaluminum.

The inside of a 1-liter glass bottle was purged with nitrogen, and it was charged with 50 g of epichlorohydrin, 4 g of allyl glycidyl ether, and 500 g of benzene. Each of the catalysts shown in Table 2 was added in the amounts indicated. The polymerization reaction was performed at 60° C. for 8 hours, and the reaction product was treated in the same manner as in Comparison Example 1.

The yield, $ML_{1+4}$ (100° C.), and the chlorine content (measured by the Schöniger's flask combustion method) of each of the resulting polymers are shown in Table. 2.

TABLE 2

| | | | Copolymer obtained | | |
|---|---|---|---|---|---|
| Run No. | Third component of catalyst | Amount* of catalyst used (g) | Yield (%) | $ML_{1+4}$(100° C.) | Chlorine content (wt. %) |
| Com. Ex. 2 | | | | | |
| 6. | — | 2.78 | 88.5 | 78.0 | 33.7 |

TABLE 2-continued

| Run No. | Third component of catalyst | Amount* of catalyst used (g) | Copolymer obtained | | |
|---|---|---|---|---|---|
| | | | Yield (%) | $ML_{1+4}(100° C.)$ | Chlorine content (wt. %) |
| 7. Ex. 1 | Pyridine | 1.09 | 91.0 | 67.0 | 33.9 |
| 8. | DBU | 1.04 | 92.0 | 75.5 | 35.7 |
| 9. | 2-ethylhexanoate of DBU | 0.94 | 95.2 | 77.0 | 33.5 |
| 10. | Oleate of DBU | 1.07 | 94.4 | 84.0 | 34.0 |
| 11. | p-toluenesulfonate of DBU | 0.73 | 94.3 | 72.5 | 34.1 |
| 12. | Formate of DBU | 0.47 | 90.3 | 73.0 | 34.7 |
| 13. | Phenolate of DBU | 1.25 | 95.6 | 79.5 | 34.6 |

(Note)
*Weight of triisobutylaluminum

Comparison Example 3

A catalyst was prepared in the same way as in Run No. 8 of Example 1 except that orthophosphoric acid was not used. Using this catalyst in an amount of 10 g as triisobutylaluminum, the polymerization reaction was conducted in the same manner as in Example 1 to afford a polymer in a yield of 25.7%.

Example 2 and Comparison Example 4

The same experiment was conducted in the same manner as in Comparison Example 1 except that the catalysts used in Comparison Example 2 and Example 1 were used in an amount of 0.2 g as triisobutylaluminum, and 12.5 g of epichlorohydrin and 1.5 g of ethylene oxide were polymerized in 33.4 g of benzene at 60° C. for 2 hours. The results are shown in Table. 3.

TABLE 3

| Run No. | Catalyst | Copolymer obtained | |
|---|---|---|---|
| | | Yield (%) | Reduced specific viscosity |
| Com. Ex. 4 | | | |
| 14. | Same as Run No. 6 of Com. Ex. 2 | 14.7 | 1.13 |
| 15. | Same as Run No. 7 of Com. Ex. 2 | 82.6 | insoluble* |
| Ex. 2 | | | |
| 16. | Same as Run No. 8 of Ex. 1 | 97.3 | insoluble* |
| 17. | Same as Run No. 9 of Ex. 1 | 96.8 | insoluble* |
| 18. | Same as Run No. 10 of Ex. 1 | 93.1 | insoluble* |

(Note)
*The resulting copolymer was insoluble in cyclohexanone, but rubbery.

Example 3

In a 100 ml glass vessel purged with nitrogen, 0.31 g of orthophosphoric acid as dispersed in 20 ml of ethyl ether, and the dispersion was reacted with 20 ml of a solution of triethylaluminum in benzene taken from a 1-liter solution prepared by dissolving 114 g of triethylaluminum in benzene. The reaction temperature was maintained at 10° C. Thereafter, DBU was added in an amount corresponding to 0.1 mol per mol of triethylaluminum, and the mixture was reacted at 60° C. for one hour to prepare a catalyst.

Then, similarly to Example 1, using 50 g of epichlorohydrin, 4 g of allyl glycidyl ether, 500 g of benzene, and the above catalyst in an amount of 0.8 g as triethylaluminum, the polymerization was performed at 60° C. for 2 hours. A rubbery copolymer was obtained in a yield of 48.3%.

Comparison Example 5

The same experiment as in Example 3 was conducted except that DBU was not used. The yield of the resulting copolymer was 21.5%.

Example 4

In a 100 ml glass vessel purged with nitrogen, 20 ml of ethyl ether and 10 ml of a solution of triisobutylaluminum in benzene taken from a 1-liter solution prepared by dissolving 200 g of triisobutylaluminum in benzene, were mixed, and 1.16 g of polyphosphoric acid was added to the mixture. The mixture was reacted at a temperature maintained at 0° C. Thereafter, 2-ethylhexanoate of DBU was added in an amount corresponding to 0.1 mol per mol of triisobutylaluminum, and the mixture was further reacted at 60° C. for one hour to prepare a catalyst.

In a similar manner to Example 1, using 50 g of epichlorohydrin, 4 g of allyl glycidyl ether, and 500 g of benzene, the polymerization was carried out at 60° C. for 8 hours in the presence of the above catalyst in an amount of 1.5 g as triisobutylaluminum, and a copolymer having $ML_{1+4}(100° C.)$ of 80.5 was obtained in a yield of 85.4%.

Example 5 and Comparison Example 6

In a 5-liter stainless steel vessel, copolymerization reaction of 228 g of epichlorohydrin, 5 g of ethylene oxide, and 22 g of allyl glycidyl ether was performed in 3000 g of benzene at 60° C. for 5 hours in the presence of the catalyst prepared in Example 1 in the amounts shown in Table 4. The results are shown in Table 4.

TABLE 4

| Run No. | Third component of catalyst | Amount* of catalyst used (g) | Copolymer obtained | | |
|---|---|---|---|---|---|
| | | | Yield (%) | $ML_{1+4}(100° C.)$ | Chlorine content (wt. %) |
| Com. Ex. 6 | | | | | |
| 19. | Pyridine | 13.5 | 100 | 70 | 28.9 |
| Ex. 5 | | | | | |
| 20. | DBU | 8.5 | 98.2 | 89 | 28.6 |
| 21. | 2-ethylhexanoate of DBU | 9.6 | 96.4 | 84.5 | 28.3 |

TABLE 4-continued

| Run No. | Third component of catalyst | Amount* of catalyst used (g) | Copolymer obtained | | |
|---|---|---|---|---|---|
| | | | Yield (%) | $ML_{1+4}(100° C.)$ | Chlorine content (wt. %) |
| 22. | Phenolate of DBU | 10.8 | 98.6 | 78 | 29.4 |

(Note)
*Weight of triisobutylaluminum

Referential Example

The copolymer prepared in Run No. 21 of Example 5 was compounded with compounding agents by a roller in accordance with the following compounding recipe. This compounding was practiced with extremely good processability. The resulting mixture was heated at 155° C. for 30 minutes under pressure to afford a vulcanizate.

| Compounding recipe | | |
|---|---|---|
| Copolymer | 100 | (parts) |
| Stearic acid | 2 | |
| FEF carbon black | 40 | |
| Calcium carbonate | 5 | |
| Magnesium oxide | 3 | |
| 2,4,6-Trimercapto-s-triazine | 0.9 | |
| N-(cyclohexyl)thiophthalimide | 1 | |
| Nickel dibutyldithiocarbamate | 1 | |

The properties of the vulcanizate were measured in accordance with JIS K-6301, and the results are shown in Table 5.

TABLE 5

| Tensile strength | (kg/cm$^2$) | 141 |
|---|---|---|
| Elongation | (%) | 540 |
| Hardness | (JIS) | 65 |

We claim:

1. A process for producing an epihalohydrin copolymer rubber, which comprises copolymerizing an epihalohydrin with another epoxy compound using as a catalyst the reaction product of an organoaluminum compound, a phosphoric acid compound and 1,8-diaza-bicyclo(5,4,0)undecene-7 or its salt.

2. The process of claim 1 wherein the organoaluminum compound is a compound represented by the following general formula $$AlR_2X_{3-n}$$

wherein R is a hydrocarbon radical, X is a hydrogen atom or a halogen atom, and n is an integer of 1 to 3.

3. The process of claim 1 wherein the phosphoric acid is orthophosphoric acid, condensed phosphoric acid, or phosphorous acid.

4. The process of claim 1 wherein the salt of 1,8-diaza-bicyclo(5,4,0)undecene-7 is carbonate, 2-ethylhexanoate, oleate, p-toluenesulfonate, formate or phenolate of 1,8-diaza-bicyclo(5,4,0)undecene-7.

5. The process of claim 1 wherein the epihalohydrin is epichlorohydrin.

6. The process of claim 1 wherein the other compound is an alkylene oxide, an alicyclic epoxide, an alkyl or aryl glycidyl ether, glycidyl acrylate, glycidyl methacrylate, styrene oxide, or epoxy stearate.

7. The process of claim 1 wherein the catalyst is a catalyst prepared by reacting 1 mol of the organoaluminum compound, 0.01 to 10 mols of the phosphoric acid, and 0.001 to 10 mols of 1,8-diaza-bicyclo(5,4,0)undecene-7 or its salt.

8. The process of claim 1 wherein 20 to 98 mol % of the epihalohydrin and 80 to 2 mol % of the other epoxy compound are used.

9. The process of claim 1 wherein the copolymerization is carried out in a solvent.

* * * * *